May 5, 1964  S. V. HORECKY  3,132,004
SHIELDED TEMPERATURE CONTROL DEVICE
Filed April 12, 1961  2 Sheets-Sheet 1

INVENTOR.
STANLEY V. HORECKY
BY
Marvin M. Chaban
ATTORNEY

May 5, 1964   S. V. HORECKY   3,132,004
SHIELDED TEMPERATURE CONTROL DEVICE
Filed April 12, 1961   2 Sheets-Sheet 2

INVENTOR.
STANLEY V. HORECKY
BY
Marvin M. Chaban
ATTORNEY

United States Patent Office 3,132,004
Patented May 5, 1964

3,132,004
SHIELDED TEMPERATURE CONTROL DEVICE
Stanley V. Horecky, Villa Park, Ill., assignor to General Electric Company, a corporation of New York
Filed Apr. 12, 1961, Ser. No. 102,431
5 Claims. (Cl. 34—48)

The present invention relates to temperature control devices and more particularly to such devices as applied to clothes dryers and the like.

In such dryers air is circulated past a radiant heat source and air so heated is used to absorb moisture from the clothes. Generally some form of temperature control must be allied with the heat source to insure that the dryer does not overheat. It is quite obvious that an overheating condition may cause scorching of the clothes and could constitute a serious fire hazard to the clothes in the dryer and to the surroundings. Conversely, if too low a temperature is used, drying would take too long. Within these extremes, a number of considerations enter into the selection of the operating temperature of the dryer. For example, with the advent of modern synthetic fibers of diverse compositions and their extensive use, the temperatures at which scorching will occur will vary considerably from one material to another. Further, as a rule, the higher the drying temperature, the faster the completion of drying. Therefore, it can be seen that it is preferable that the heaters be operated at a relatively high temperature provided that temperature is safe for the fabrics being dried, and it is further preferable that the temperature of operation be capable of being selected to fit the specific fabric being dried.

The usual method of supplying this temperature selectivity is to provide a thermostat whose operating characteristics may be adjusted as required. In order to provide this adjustability in a dryer, which requires heavy current usage, hydraulically operated thermostats are generally used. This type of thermostat requires sealed tube systems and expansion bellows or capsules for the hydraulic fluid and as a result are comparatively expensive and subject to damage. It of course would be much more commercially advantageous to utilize a bi-metal or thermistor type of temperature controlling thermostat since these thermosensitive devices are simpler and more rugged in construction, and are considerably less expensive. The latter mentioned types of thermostats, however, have invariant temperature characteristics and are not generally capable of varied temperature response, especially where high current carrying capacity is required.

It is therefore an object of the invention to provide a temperature sensitive structure of adjustable temperature response while employing a fixed temperature response thermostat or temperature sensor.

It is a further object of the invention to provide a fixed response temperature sensor positioned adjacent a heat source with an adjustable heat shield interposed between the sensor and the source to allow the selection of the quantity of heat from the source which is allowed to reach the sensor, thereby resulting in a variable response temperature sensing device.

It is a still further object of the invention to provide a radiant heat source where a flow of air is induced past the heat source for extracting heat therefrom, and adjoining said heat source a fixed response temperature sensor positioned in the air flow path. A thermal shield is provided to partially cover the temperature sensor and this shield may be adjusted from one extreme position blocking much of the radiant energy emitted by the source from reaching the sensor, through one or more intermediate positions to an opposite extreme position exposing the sensor to a large proportion of the heat generated by the source and in fact aiding the generated heat in reaching said sensor.

Other objects, features and advantages of the invention will be apparent from the detailed description of a presently preferred embodiment thereof, read in connection with the accompanying drawings in which.

Figure 1:
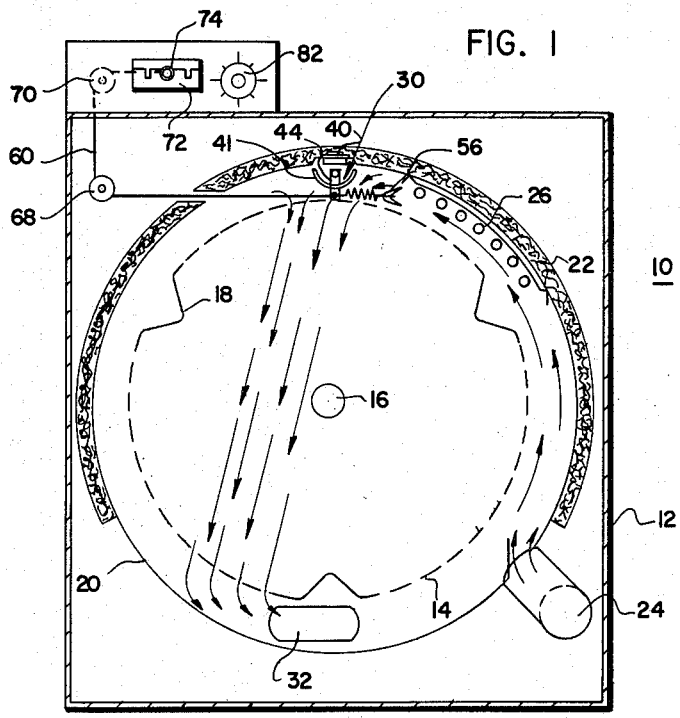
FIG. 1 is a front sectional view of a dryer embodying my invention; this view being taken along the lines 1—1 of FIG. 2.
Figure 2:
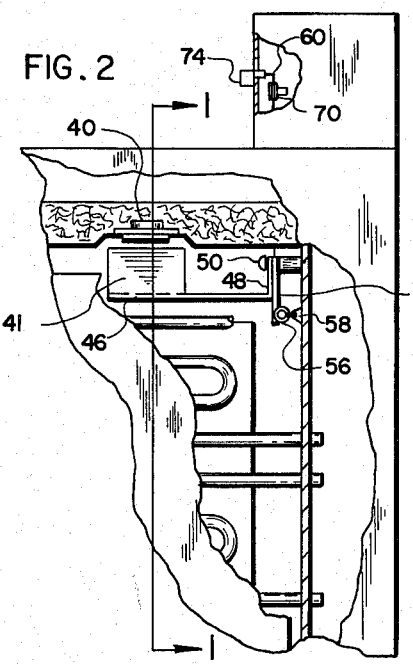
FIG. 2 is a partial side elevational view of my dryer.

This invention has been shown exemplarily in conjunction with a clothes dryer of generally known construction. The invention is equally useful in a combination washer-dryer, or any other drying apparatus utilizing a heat source and air circulation as the principal drying mechanism. As illustrated, the dryer 10 utilized herein and shown in FIGS. 1 and 2 is constructed with an outer substantially imperforate appearance cabinet 12. Within the cabinet, a perforated sidewall cylindrical drum 14 is journalled for rotation about a horizontal axis 16. The drum includes along its inner cylindrical surface, a plurality of spaced tumbling ribs 18 of known design. Spaced outwardly of the drum and concentric thereto is positioned a stationary cylindrical casing 20 which serves to enclose the area in which heated air is circulated. About the upper two-thirds of the cylindrical sidewall of casing 20 the surface is covered by a suitable layer 22 of heat insulating material such as glass fiber.

Air is drawn into the dryer cabinet by any of the three generally used means such as (1) a blower, (2) the tumbling action of the drum, or (3) the air circulation effort of a condensing system. Using any one of these known expedients, air from outside the machine enters a duct 24 which channels the air into the space between the outer tub and the tumbling drum, as indicated by the direction arrows. Although the drum is perforated, the effect of the rotating drum sidewall, that of clothes resting against the perforated wall and the chimney effect induced by the heat will combine and tend to inhibit the immediate passage of air into the drum. The air drawn into the machine therefore rises about the drum exterior, passes the area occupied by the heating elements 26 and continues upwardly in the area between casing and drum past the thermostat structure 30. The thermostat structure is positioned substantially above the axis of the drum so that it is sensitive to the temperature of the air leaving the heater area. At a point just short of that directly above the machine axis, the clothes in the tub will tend to fall off the interiorly ribbed sidewall and drop toward the drum bottom. The air which is now heated will enter the drum through perforations uncovered by the separation of the clothes from the drum sidewall. The fall of the clothes creates a pumping action, as well known in the art, whereupon heated air enters the drum, and flows in intimate contact with the falling clothes. Moisture from the wet clothes is absorbed by the air and the damp air is expelled from the drum into the casing and out through exhaust duct 32. A suitable suction blower (not shown) may in the conventional manner be placed in the exhaust duct to create a greater degree of air flow.

The general construction just described is quite well known in the art and of general usage. Within this construction there is provided the thermostat structure 30 (FIG. 1). This structure includes a thermostat 40 of fixed temperature characteristics in that it will change condition from one stable state to another at a fixed or predetermined temperature. The thermostatic element may be a bimetallic strip or disc which is bi-stable in that it maintains its armature contact 40.1 in a normal position closing a circuit to stationary contact 40.2 at temperatures below its actuation level, moves its armature 40.1 to a second steady state (open circuit condition) at temperatures elevated above the fixed temperature, and restores to original condition upon reduction in temperature.

In general, a thermostat in a dryer may be used to control and maintain within certain limits the operating temperature of the air within the dryer. The thermostat should therefore be capable of responding to pre-selected temperatures to set operating limits for the various fabrics in use. For example, if a shag rug is to be dried, obviously it will require a higher operating temperature than will a load of synthetics. To accomplish this result my invention utilizes a fixed operating level thermostat with means for varying the heat which is allowed to reach the thermostat. This varying function is performed by the arcuate shield member 41 which is approximately semi-cylindrical in extent and which may be adjusted to vary its shielding characteristics.

Figure 6:
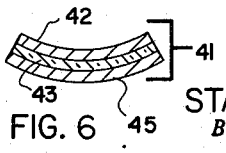
FIG. 6 is a cross-sectional view of a form of heat shield.

In construction detail, the shield 41 optimally may be fabricated by using a series of laminations as best shown in FIG. 6. Among the layers there is included an inner arcuate layer 42 which would be fabricated of highly reflective polished metal. Radially outwardly of layer 42 is a layer 43 of asbestos, silicone rubber or other suitable high temperature insulating material. The outer lamina or layer 45 is configured of a heat reflective metal similar or identical to layer 42 but it need not be as highly polished. The laminations are suitably bonded together by any known means to form a single operative shielding member 41. With this laminar construction radiant heat striking one metallic layer will be reflected away from the shield and little heat will be conducted from one metallic lamina to the other. Thus, in effect each metal lamina 42 and 45 is effectively heat insulated from the other within the normal heat conductive limits.

Shield 41 is specifically positioned relative to the bimetal member, the path of heated air, and the radiant energy of the heating elements 26 so as to adjustably intercept the heat energy to which the bimetal element would be exposed. The mounting of the shield to provide for its adjustment, may be by a lever 44. Lever 44 includes a horizontal arm 46 affixed to the shield member and a vertical arm 48 which is pivoted about a rod 50 near its extreme end. Rod 50 optimally may be secured to the rear wall 52 of casing 20. Lever 44 further includes a vertical link arm 54 which is secured to arm 48 and pivotal therewith about pivot 50. At the lower end of link arm 54, there is secured a tension spring 56, which is secured at its other end to a mounted emboss 58 formed in the tub rear wall.

At one point of securement of tension spring 56 to extending arm 54 there is opposing the bias of tension spring 56 a cable 60. This cable extends through a suitable slot 66 in the casing wall, is looped about spaced pulleys 68 and 70, extends further into slotted escutcheon plate 72 and terminates at a fastening to a manually graspable handle 74. By the use of this pulley linkage, movement in the horizontal plane of handle 74 will rotate link arm 54 and arm 48 about pivot 50, whereupon shield member 41 will assume a selected position relative to the thermostat element 40. This pivotal movement is either aided by or opposed by the spring 56, according to the direction of cable movement.

The thermostat as employed herein could be one which operates at a fixed temperature of 150° F. if the dryer is a blower type and would have an operating level of 185° F. if the dryer uses a recirculatory condensing system. This follows the generally known reasoning that the intermediate operating temperature setting of a blower dryer is approximately 155° F. while the normal intermediate setting on a condenser dryer is within the range of 190° F. With reference to the present invention, it will be assumed exemplarily that a blower dryer is being utilized, that thermostat 40 is one which changes from its normal state at 150° F., and that there are but minor heat losses between heaters 26 and thermostat 40.

Figure 3:
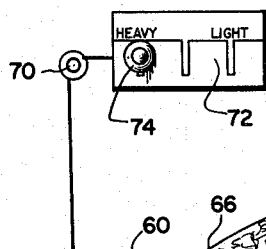
FIG. 3 is a view in detail of the shield in a thermally blocking position, the remainder of the drawing being somewhat diagrammatic.
Figure 3:
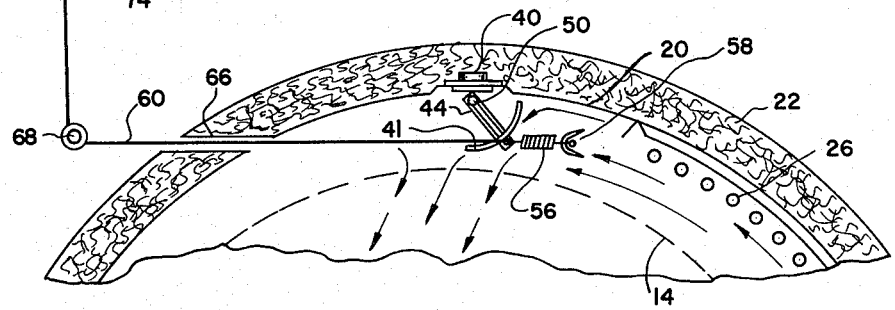
Figure 4:
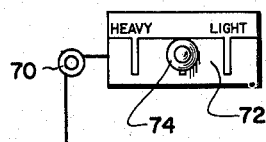
FIG. 4 is a view as FIG. 3 with the shield in a central position.
Figure 4:
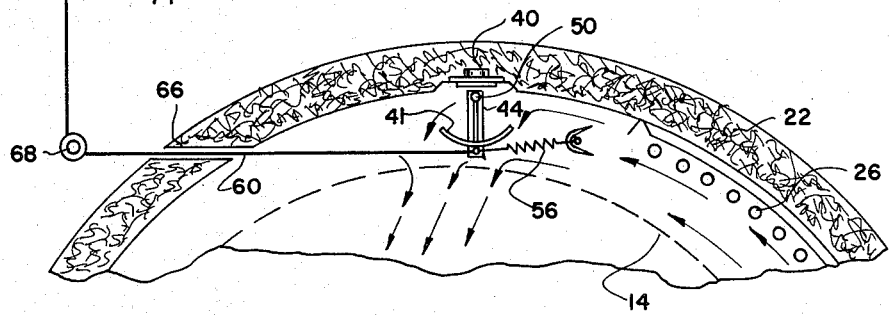
Figure 5:
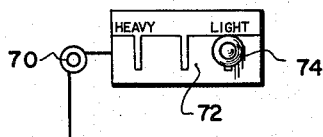
FIG. 5 is a view as FIGS. 3 and 4 showing the shield in an extreme thermally receptive position.
Figure 5:
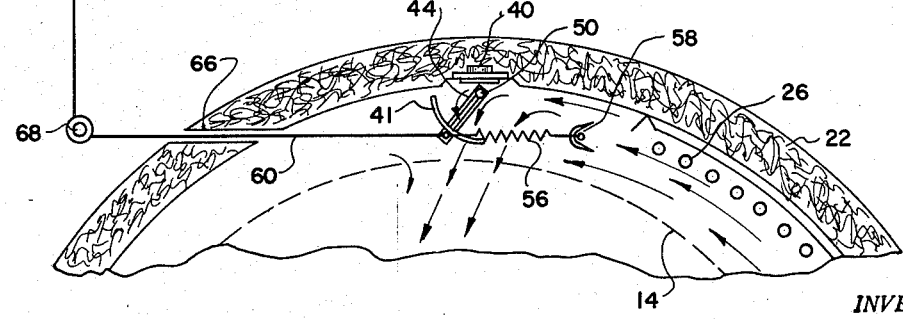

Referring now in further detail to FIGS. 3–5, the linkage previously described may be seen in the different positions. In the position of FIG. 3, the handle 74 is at its left most or "Heavy Fabric" position. In this position the effect of spring 56 pivots lever 44 to the right and shield 41 is moved to its right-most position blocking a substantial part of the heated air flow from reaching thermostat 40. Further heat will be reflected away from the thermostat by the curved laminar wall 45 of the shield tending to isolate thermostat 40 from heat source 26. With the shield in this isolating position, a high temperature or air leaving the heaters will be required to trigger thermostat 40 since only a small percentage of the passing heated air will impinge upon thermostatic element 40. This position is the one which would be employed when high operating temperature is required.

When an intermediate heat position, such as that shown in FIG. 4, is required, the handle is moved to the center slot in plate 72 and cable 60 supports the shield against the bias of tension spring 56. Shield 41 assumes the partially blocking position, in which a moderate amount of heated air will reach the thermostat 40. The thermostat will receive more of the generated heat and will react more quickly to temperature rise than in the FIG. 3 position.

In the position of FIG. 5, the cable 60 is drawn taut to allow the handle to reach the "Light Fabrics" position, in which the shield 41 not only exposes the thermostat 40 to maximum heat exchange with the flow of heated air, but also intercepts radiant energy on its inner curved surface and reflects such energy toward thermostat 40. Thus, in addition to the free flow of heated air past the thermostat, the exposure of the thermostat to reflected heat from the shield will speed the response of the thermostat to a rise in temperature.

Utilizing the previously mentioned example of the blower dryer, the air temperature through the drum while utilizing the high heat position of FIG. 3 would be approximately 170° F. This would require a temperature at the heaters of approximately 180° F. The thermostat for this application will at all times respond to received temperature of 150° F. and hence the shield adjustment would be calibrated to maintain thermostat 40 at a temperature about 30° less than the temperature at the heaters.

With an intermediate setting (FIG. 4) the desired air temperature through the drum would be approximately 145° F. which would require a temperature at the heaters of approximately 155° F. The shield 41 in the intermediate position would be such that the thermostat would sense in generally unimpeded fashion the temperature of the air leaving the heaters. With the few degrees in temperature lost by the air the thermostat temperature would be closed to that of the air leaving the heaters.

For the low heat position with the shield in the setting of FIG. 5, the heat generated by the heaters should be on the order of 120° F. so that the air temperature through the drum would approximate 110° F. The shield 41 cocked in the reflecting position would in this position cause the 150° F. thermostat to operate quite rapidly at the lower air heater temperature.

Figure 7:
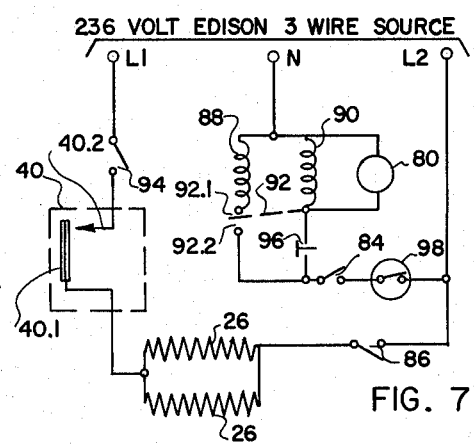
FIG. 7 is a diagrammatic drawing of an electric circuit for a dryer utilizing my invention.

FIG. 7 shows a typical circuit utilizing my thermostat 40 for controlling a dryer. The circuit is connected to a standard 3 wire Edison source which develops 236 volts across leads L1 and L2 and develops 118 volts across either outside leads L1 and L2 and the intermediate lead N.

The duration of a cycle is controlled by timer motor 80 which is preset by rotation of control knob through an arc of settable length. The timer motor on actuation rotates a cam shaft (not shown) in step-by-step fashion through an arc of determinate length in a fixed interval of time opening or closing as need be, its control contacts 84 and 86. Further there is provided a drive motor (not shown) with its start winding 88, its run winding 90 and two sets of contacts actuated when the motor reaches approximately its running speed. In a first of these contact sets, armature contact 92 is normally closed to a first contact 92.1 and on actuation responsive to motor acceleration opens the circuit to stationary contact 92.1 and closes to a second stationary contact 92.2. The other of these contact sets includes contacts 94 which are merely open or closed. Finally, as circuit elements there are a momentary start button 96 which may be part of the control knob 82, and a high temperature or shut-off thermostat 98. Other circuit components unnecessary to the explanation of the disclosure have been omitted.

In operation, wet clothes are set in machine, knob 82 is set for the time required, and handle 74 is placed in the slot consonant with the clothes being dried. If it is assumed that a shag rug is being dried, handle 74 is placed in the high temperature position of FIG. 3. Button 96 is then depressed, closing a circuit from lead N through starting winding 88, contacts 92.1, contacts 96, closed timer contacts 84, and high temperature thermostat 98 to lead L2. The run winding 90 is also closed through contacts 96 over an obvious path. The motor accelerates following energization of its start and run windings, and the run winding locks itself operated by closure of contact 92 to contact 92.2. This closure also locks the timer motor operated over the same path and opens the start winding. When motor run winding 90 reaches its run speed, contacts 94 close a 236 volt circuit to the heaters, through closed contacts 40.1 of thermostat 40 and timer contacts 86.

As heat is generated by the heaters, circulating air is heated and flows in the direction indicated by the arrows in FIG. 3. Shield 41 blocks the heated air flow and the radiant energy generated by the heaters from reaching the thermostat. This isolation of the thermostat will allow a high temperature condition to be generated by the heaters before thermostat 40 receives sufficient heat to respond by actuating its armature contact 40.1. Contact 40.1 on actuation opens the heater circuit to contact 40.2 and the circuit remains open until the temperature at the heater drops sufficiently to return the thermostat to its normal low temperature condition. This return closes the circuit to the heaters once again and the internal temperature again rises. Thermostat 40 continues to cycle the heating circuit until the preset cycle duration has elapsed, at which time contacts 86 and 84 open simultaneously or may be set to open sequentially after a few minutes delay to allow a short cool-down period. The operation of the circuit for other positions is evident within the description previously set out and need not be repeated.

It should be noted that although only three positions have been employed in illustrating my temperature controller, it is quite obvious that the principle is applicable to provide any number of intermediate temperature control positions.

While there has been described what is at present though to be the preferred embodiment of my invention, it will be understood that it is my intention to cover in the appended claims all modifications which properly fall within the true sphere and scope of my invention.

What is claimed is:

1. A thermo-sensing structure for controlling the operation of a radiant heat energy source comprising: a thermostat with fixed temperature response characteristics, means for creating a flow of air over said energy source to abstract heat therefrom, means disposing said thermostat to receive radiant heat energy and heat from said flow of heated air, an arcuate shield member interposed in the path of said air flow with its concave wall facing said thermostat, means for selectively moving said member to a first extreme position having its convex face upstream of said thermostat as respects said air flow for thereby shielding said thermostat from said energy source and said air flow, means for selectively moving said member to an opposite extreme position having its concave face exposed to said thermostat downstream of said thermostat, thereby exposing said thermostat to said energy source and for reradiating heat energy to said thermostat, and means for positioning said member between said two extreme positions to a selected intermediate position, whereby to selectively control the heat energy available at said thermostat to operate the same.

2. In a clothes dryer adapted to dry clothes by absorbing moisture from the clothes into a flow of heated air, means for circulating air through said dryer, means for radiantly heating the air for circulation to the clothes being dried, means for controlling said heating means comprising a thermostat downstream of said heating means, shielding means comprising an arcuate plate having its inner surface curved to direct radiant heat from said heating means to said thermostat in one position of said shielding means to accelerate the rate of heat directed to said thermostat and consequently the response of said thermostat, means for rotating said plate whereby said shielding means may be rotated to another position in which the outer convex surface of said plate is between said thermostat and said heating means to thereby decelerate the rate of heat reaching said thermostat and the response of said thermostat, means for reducing heat transfer from said outer to said inner surfaces, and means controlled by the response of said thermostat to heat energy impinging thereon for changing rate of heat circulated from said heating means.

3. A thermo-sensing structure according to claim 1, in which said shield comprises an imperforate arcuate plate mounted for rotation about an axis parallel to said thermostat.

4. The heat controlling means according to claim 2, in which said shielding means comprises a laminated structure in which an intermediate lamination is of heat insulation material.

5. The heat controlling means according to claim 2, in which said shielding means comprises a laminated plate in which the innermost wall surface is polished for maximum reflectivity, and an intermediate lamination is of heat insulation material.

References Cited in the file of this patent

UNITED STATES PATENTS

| | | |
|---|---|---|
| 1,704,352 | Thomson | Mar. 5, 1929 |
| 2,611,855 | Turner | Sept. 23, 1952 |
| 2,619,734 | Geldhof | Dec. 2, 1952 |
| 2,662,963 | Wessel | Dec. 15, 1953 |
| 2,783,332 | Kunzler | Feb. 26, 1957 |
| 2,790,247 | Olthius | Apr. 30, 1957 |
| 3,075,063 | Salton | Jan. 22, 1963 |